US010637994B2

(12) United States Patent
Amin et al.

(10) Patent No.: US 10,637,994 B2
(45) Date of Patent: Apr. 28, 2020

(54) MITIGATING ATTACKS ON EMERGENCY TELEPHONE SERVICES

(71) Applicant: T-Mobile USA, Inc., Bellevue, WA (US)

(72) Inventors: Rahul Amin, Issaquah, WA (US); Tharunika Sridhar, Bellevue, WA (US); Rex Maristela, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/439,660

(22) Filed: Jun. 12, 2019

(65) Prior Publication Data

US 2020/0084318 A1    Mar. 12, 2020

Related U.S. Application Data

(63) Continuation of application No. 16/109,686, filed on Aug. 22, 2018, now Pat. No. 10,367,946, which is a
(Continued)

(51) Int. Cl.
*H04M 7/00* (2006.01)
*H04L 29/06* (2006.01)
(Continued)

(52) U.S. Cl.
CPC ...... *H04M 7/0078* (2013.01); *H04L 63/1416* (2013.01); *H04L 63/1425* (2013.01);
(Continued)

(58) Field of Classification Search
USPC ...................................................... 455/404.1
See application file for complete search history.

(56) References Cited

U.S. PATENT DOCUMENTS 7,594,266 B2 * 9/2009 Mattsson .............. G06F 21/552
726/22
8,040,862 B1    10/2011 Rosenberg et al.
(Continued)

FOREIGN PATENT DOCUMENTS

KR    20100120823 A    11/2010
WO    2019060709 A1    3/2019

OTHER PUBLICATIONS

U.S. Appl. No. 16/109,686 (issued as U.S. Pat. No. 10,367,946) filed Aug. 22, 2018; titled Mitigating Attacks on Emergency Telephone Services.
(Continued)

*Primary Examiner* — Maria El-Zoobi
(74) *Attorney, Agent, or Firm* — Perkins Coie LLP

(57) ABSTRACT

The disclosed system provides a Real-time Telephony (or Call) Monitor, Analyzer and Decision SIP Server (RT-MADS) for mitigating attacks on emergency telephone systems. The RTMADS works in conjunction with an ingress node to fork incoming calls to an IMS network and the RTMADS. Within the RTMADS, forked telephone calls undergo data collection and mining, and parametric analysis. A decision matrix in the RTMADS uses the results of the data collection, mining, and parametric analysis, and other information, to make a decision with respect to incoming calls. For example, the RTMADS may decide to perform call setup on an incoming call using a dedicated or backup Public Safety Answering Point (PSAP), alert an Operations and Management (OAM) team regarding the incoming call, or accept and then terminate the incoming call.

20 Claims, 7 Drawing Sheets

Related U.S. Application Data continuation of application No. 15/712,096, filed on Sep. 21, 2017, now Pat. No. 10,104,237.

(51) Int. Cl.
  *H04M 3/51* (2006.01)
  *H04W 12/12* (2009.01)
  *H04W 4/90* (2018.01)

(52) U.S. Cl.
  CPC ...... *H04L 63/1441* (2013.01); *H04L 63/1458* (2013.01); *H04L 65/102* (2013.01); *H04L 65/1006* (2013.01); *H04L 65/1016* (2013.01); *H04L 65/1069* (2013.01); *H04L 65/1079* (2013.01); *H04L 65/1096* (2013.01); *H04M 3/5116* (2013.01); *H04W 4/90* (2018.02); *H04W 12/1204* (2019.01); *H04M 7/0084* (2013.01); *H04M 2203/60* (2013.01)

(56) References Cited

U.S. PATENT DOCUMENTS

| | | |
|---|---|---|
| 10,104,237 B1 | 10/2018 | Amin et al. |
| 10,367,946 B2 | 7/2019 | Amin et al. |
| 2006/0153353 A1 | 7/2006 | O'Neil |
| 2007/0066277 A1 | 3/2007 | Bharatia et al. |
| 2007/0071221 A1 | 3/2007 | Allen et al. |
| 2010/0144344 A1 | 6/2010 | Jiang |
| 2010/0202368 A1 | 8/2010 | Hans |
| 2010/0232403 A1* | 9/2010 | Qiu ............... H04M 11/04 370/338 |
| 2013/0077766 A1* | 3/2013 | Keller ............ H04M 3/42365 379/45 |
| 2014/0162582 A1 | 6/2014 | Daly et al. |
| 2015/0063350 A1* | 3/2015 | Sundaram ......... G06F 16/1744 370/389 |
| 2015/0092610 A1 | 4/2015 | Russell et al. |
| 2015/0181033 A1 | 6/2015 | Keller et al. |
| 2016/0379470 A1 | 12/2016 | Shurtz |

OTHER PUBLICATIONS

U.S. Appl. No. 15/712,096 (issued as U.S. Pat. No. 10,104,237) filed Sep. 21, 2017; titled Mitigating Attacks on Emergency Telephone Services.

International Searching Authority, International Search Report and Written Opinion, PCT Patent Application PCT/US2018/052199, dated Jan. 16, 2019, 10 pages.

* cited by examiner

MITIGATING ATTACKS ON EMERGENCY TELEPHONE SERVICES

CROSS-REFERENCE TO RELATED APPLICATION

This application is a continuation of U.S. patent application Ser. No. 16/109,686 filed Aug. 22, 2018, entitled "MITIGATING ATTACKS ON EMERGENCY TELEPHONE SERVICES"; which is a continuation of U.S. patent application Ser. No. 15/712,096, filed Sep. 21, 2017, now U.S. Pat. No. 10,104,237, entitled "MITIGATING ATTACKS ON EMERGENCY TELEPHONE SERVICES"; both of which are incorporated by reference in their entireties.

BACKGROUND

Emergency telephone services, such as 911 calls to a Public Safety Answering Point (PSAP), are an important public safety mechanism for connecting distressed callers to emergency services that are needed in often dire circumstances. Such 911 calls or distress calls (herein referred to collectively as "emergency calls") often rely on Voice over Internet Protocol (VoIP) telephony nodes to facilitate a connection between a distressed caller and one or more PSAPs. Unfortunately, VoIP telephony nodes are constantly under threat because of their accessibility via the Internet. For example, malicious attackers may target the VoIP nodes with malformed Session Initiation Protocol (SIP) messages, exploit security holes, and/or flood the VoIP network with fake or spoofed calls. These types of Telephony Denial of Services (TDoS) and Distributed Denial of Services (DDoS) attacks on critical application servers can have severe repercussions on the availability of emergency services to a distressed caller. This is particularly true when PSAPs are flooded and over loaded with emergency calls without enough emergency responders available to answer the calls.

The resulting inability to reach emergency services creates potentially life-threatening situations for distressed callers in need of assistance. A need therefore exists to mitigate malicious attacks on emergency services over IP networks, including VoIP networks, which are generally architected as an Internet Protocol Multimedia Subsystem (IMS) network (or a variant thereof) involving multiple nodes that provide specific functionalities. A typical IMS network comprises multiple nodes that offer functionalities based on developed standards and protocols as disclosed and incorporated by reference below. Accordingly, a solution to mitigate telephony attacks is needed that does not interfere with existing standards but rather uses available protocols to interoperate with various IMS nodes. Therefore, a need further exists to mitigate telephony attacks using a commonly used VoIP protocol, such as SIP.

DETAILED DESCRIPTION

The disclosed system provides a Real-time Telephony (or Call) Monitor, Analyzer and Decision SIP Server (RTMADS) for mitigating attacks on emergency telephone systems. The RTMADS works in conjunction with an ingress node, such as a Session Border Controller (SBC) that functions as a VoIP node, to fork incoming calls to an IMS network and the RTMADS. Within the RTMADS, forked telephone calls undergo data collection and mining, and parametric analysis. A decision matrix in the RTMADS uses the results of the data collection, mining, and parametric analysis, along with analysis criteria and decision criteria, to make a decision with respect to incoming calls. For example, the RTMADS may decide to perform call setup on an incoming call using a dedicated Public Safety Answering Point (PSAP), alert an Operations and Management (OAM) team regarding the incoming call, perform call setup on the incoming call using a backup PSAP, or accept and then terminate the incoming call. Each of these scenarios is discussed in more detail herein.

The disclosed system is adapted to operate in various types of telecommunications and data networks, including second-generation wireless telephone technology (2G) networks, third-generation wireless telephone technology (3G) networks, fourth-generation wireless telephone technology (4G) networks, long-term evolution (LTE) networks, Local Access Networks (LAN), Wireless LANs (WLAN), Global System for Mobile Communications (GSM) networks, Bluetooth, WiFi, Fixed Wireless Data networks.

The disclosed system is compatible with a variety of networks but is suited in particular for IMS networks. The disclosed system is adapted to comply fully with Session Initiation Protocol (SIP) and 3GPP standards, including 3GPP TS 23.218 (IP Multimedia session handling; IM call model; Stage 2), RFC 7976 ((2016): Updates to Private Header (P-Header) Extension Usage in Session Initiation Protocol (SIP) Requests and Responses), RFC 4975 (Message Session Relay Protocol), and RFC for SIP standards including for example RFC 3261 (SIP: Session Initiation Protocol), all of which are hereby incorporated by reference herein in their entirety.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Figure 1:
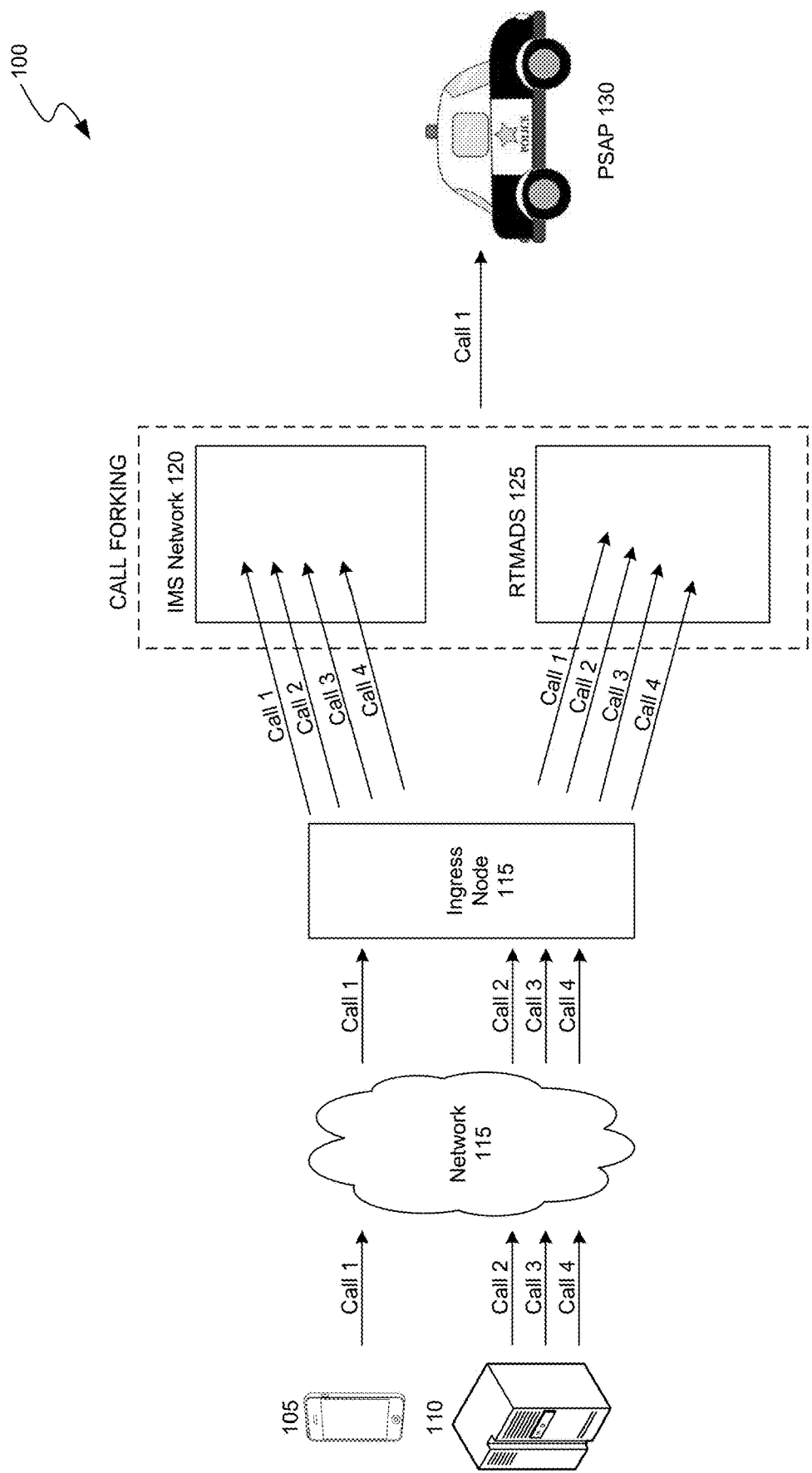
FIG. 1 is a diagram of a representative environment in which the disclosed system to mitigate attacks on emergency telephone services may operate.

FIG. 1 is a diagram of a representative environment in which the disclosed system may operate. In the environment 100, mobile device 105 attempts to place a legitimate emergency call (Call 1) to a PSAP via network 115. Attack server 110 attempts to place three malicious emergency calls (Call 2, Call 3, and Call 4) via network 115 for the purpose of attacking emergency call services. Ingress node 115 receives calls 1-4 and forks each call to IMS 120 and RTMADS 125. As described in more detail herein, RTMADS 125 detects malicious calls (e.g., Call 2, Call 3, and Call 4) and terminates the malicious calls without delivery to a PSAP. Likewise, RTMADS 120 detects legitimate emergency calls (e.g., Call 1) and allows the legitimate emergency calls to be delivered to a PSAP, such as police agency 130. Such legitimate emergency calls may be delivered to the PSAP by an existing IMS network, such as IMS 120.

Attack server 110 may be a single malicious caller, a group of malicious callers, or an automated dialer (such as a robo-dialer) that is configured to generate malicious telephone calls. Network 115 may be any telecommunications network capable of facilitating the transfer of messages between a call originator (e.g., a distressed caller, a malicious caller, or an attack server) and a PSAP, including for example an Internet Protocol Multimedia Subsystem (IMS) network. Mobile devices 105 and attack server 110 may include virtually any devices for communicating over a wireless network. Such devices include application servers or mobile telephones, such as Global System for Mobile Communications ("GSM") telephones, Time Division Multiple Access ("TDMA") telephones, Universal Mobile Telecommunications System ("UMTS") telephones, Evolution-Data Optimized ("EVDO") telephones, Long Term Evolution ("LTE") telephones, Generic Access Network ("GAN") telephones, Unlicensed Mobile Access ("UMA") telephones, and other mobile computers or devices, such as Voice over Internet Protocol ("VoIP") devices, Secure User Plane Location ("SUPL") Enabled Terminals (SETs), Personal Digital Assistants ("PDAs"), radio frequency devices, infrared devices, handheld computers, laptop computers, wearable computers, tablet computers, pagers, integrated devices combining one or more of the preceding devices, and/or the like.

Mobile device 105 and attack server 110 typically include a processing unit, volatile memory and/or nonvolatile memory, a power supply, one or more network interfaces, an audio interface, a display, a keypad or keyboard and other input and/or output interfaces. The various components of a mobile device or attack server may be interconnected via a bus. The volatile and nonvolatile memories generally include storage media for storing information such as processor-readable instructions, data structures, program modules, or other data. Some examples of information that may be stored include basic input/output systems (BIOS), operating systems, and applications.

Mobile device 105 and attack server 110 may connect to a telecommunications network via a trusted radio access network (RAN) or an untrusted RAN (not shown). A single mobile device or attack server may be capable of using one or both types of RANs. The RANs may use any wireless communications and data protocol or standard, such as GSM, TDMA, UMTS, EVDO, LTE, GAN, UMA, Code Division Multiple Access ("CDMA") protocols (including IS-95, IS-2000, and IS-856 protocols), Advanced LTE or LTE+, Orthogonal Frequency Division Multiple Access ("OFDM"), General Packet Radio Service ("GPRS"), Enhanced Data GSM Environment ("EDGE"), Advanced Mobile Phone System ("AMPS"), WiMAX protocols (including IEEE 802.16e-2005 and IEEE 802.16m protocols), Wireless Fidelity ("WiFi"), High Speed Packet Access ("HSPA"), (including High Speed Downlink Packet Access ("HSDPA") and High Speed Uplink Packet Access ("HSUPA")), Ultra Mobile Broadband ("UMB"), SUPL, and/or the like.

Each mobile device 105 and attack server 110 typically includes a processor for executing processing instructions, a data storage medium component (e.g., hard drive, flash memory, memory card, etc.), volatile memory and/or nonvolatile memory, a power supply, one or more network interfaces (e.g., Bluetooth Interface; and Network Communication Interface, which enables the mobile device or attack server to communicate by transmitting and receiving wireless signals using licensed, semi-licensed or unlicensed spectrum over a telecommunications network), an audio interface, a display, a keypad or keyboard, a microphone, and other input and/or output interfaces. The various components of the mobile device and attack server may be interconnected via a bus. The volatile and nonvolatile memories generally include storage media for storing information such as processor-readable instructions, data structures, program modules, or other data. Some examples of information that may be stored include basic input/output systems (BIOS), operating systems, and applications. The stored information may include one or more SIP protocol clients capable of generating, transmitting and interpreting syntactically correct SIP protocol messages. SIP clients permit the mobile device to register with and communicate via the IMS network.

Figure 2:
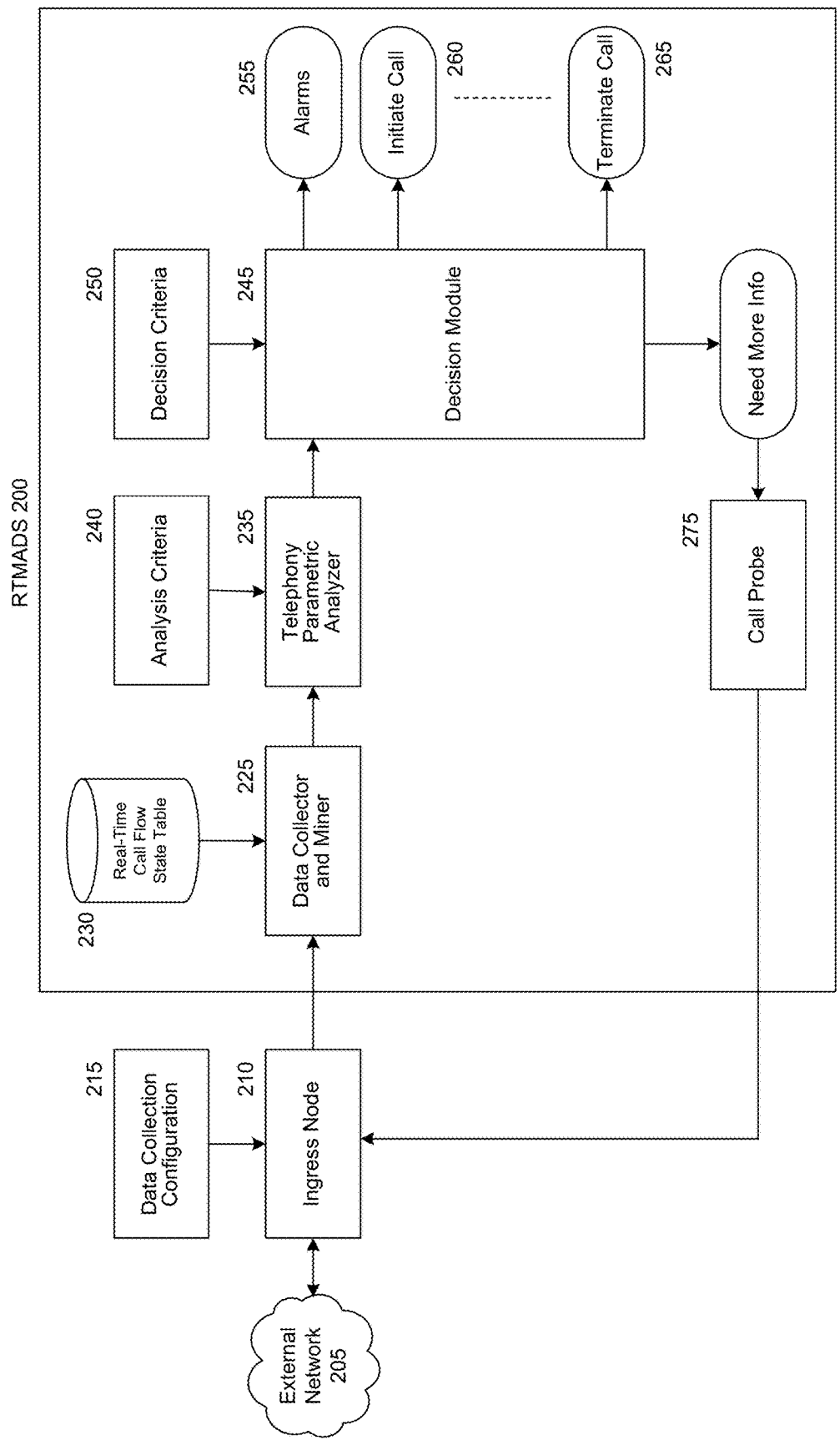
FIG. 2 is a block diagram of the disclosed system to mitigate attacks on emergency telephone services in accordance with embodiments herein.

FIG. 2 is a block diagram of the disclosed system to mitigate attacks on emergency telephone services in accordance with embodiments herein. External network 205 may comprise any network, such as the Internet or a service provider network, capable of routing a call (e.g., a VoIP call) to an IMS network. Ingress node 210 may be configured using standardized SIP RFC compliant procedures to send relevant calls to the RTMADS. In an embodiment, ingress node 210 is a Session Border Controller (SBC) that sends relevant calls to the RTMADS by forking SIP calls. Call data may be collected via various types of configurations, including for example configurations involving men in the middle (MITM) type probes. Ingress node 210 is typically an entry point to a service provider IMS VoIP network and may be configured via a data collection configuration component 215 to fork emergency SIP calls and other potentially harmful or malicious calls that can overload the telephony system. Accordingly, when the IMS network is under attack by flooding of spoofed or robo emergency calls, ingress node 210 will fork the calls. Call forking results in an SIP INVITE being sent to the RTMADS server in addition to the original intended PSAP recipient via the IMS network.

RTMADS 200 is part of the emergency call flow and monitors emergency calls, collects data and uses algorithms to respond appropriately to the emergency calls if and when necessary. Upon receiving a forked call (i.e., upon receiving an SIP INVITE), RTMADS 200 starts a "Trts" timer, and executes a decision based on dynamic conditions and criteria as described in more detail herein. RTMADS 200 is a multifunctional node that is deployed in a VoIP network. RTMADS 200 is integrated with the VOIP network call flows and uses machine learning (rather telephony learning) to collect, store and mine relevant data. RTMADS 200 analyzes this data to detect attacks, sends alerts, and uses a decision module to decide various actions to take in order to mitigate an attack. Based on the type of attack, the decision module executes a decision function or initiates a probe for gathering more specific data before taking action. RTMADS 200 is adapted to be a part of the SIP call flow for incoming calls, and is capable of performing varied roles depending on the nature of an attack. In particular RTMADS may perform the role of a User Agent Client (UAC), User Agent Server (UAS), Back-to-Back User Agent (B2BUA), Proxy Server, and/or Redirect Server. RTMADS 200 comprises several components including data collector and miner 225, telephony parametric analyzer 235, decision matric 245, and call probe 275, as described in more detail herein.

Data Collector and Miner 225 receives forked calls from ingress node 210 and distills received call flows, including requests and responses, into a real-time stateful table 230 for each active call. Data Collector and Miner 225 creates real-time stateful table 230 with multiple parameters that are part of the call flow, including without limitation SDP: RURI, FROM, TO, Via, Call-ID, Contacts, P-headers, SDP, Accept, Accept-Contact, Accept-Encoding, Accept-Language, Accept-Resource-Priority, Alert-Info, Allow, Allow-Events, Answer-Mode, Authentication-Info, Authorization, Call-ID, Call-Info, Cellular-Network-Info, Contact, Content-Disposition, Content-Encoding, Content-Language, Content-Length, Content-Type, CSeq, Date, Encryption, Error-Info, Event, Expires, Feature-Caps, Flow-Timer, From, Geolocation, Geolocation-Error, Geolocation-Routing, Hide, History-Info, Identity, Identity-Info, In-Reply-To, Join, Max-Breadth, Max-Forwards, MIME-Version, Min-Expires, Min-SE, Organization, P-Access-Network-Info, P-Answer-State, P-Asserted-Identity, P-Asserted-Service, P-Associated-URI, P-Called-Party-ID, P-Charging-Function-Addresses, P-Charging-Vector, P-DCS-Trace-Party-ID, P-DCS-OSPS, P-DCS-Billing-Info, P-DCS-LAES, P-DCS-Redirect, P-Early-Media, P-Media-Authorization, P-Preferred-Identity, P-Preferred-Service, P-Private-Network-Indication, P-Profile-Key, P-Refused-URI-List, P-Served-User, P-User-Database, P-Visited-Network-ID, Path, Permission-Missing, Policy-Contact, Policy-ID, Priority, Priv-Answer-Mode, Privacy, Proxy-Authenticate, Proxy-Authorization, Proxy-Require, Rack, Reason, Reason-Phrase, Record-Route, Recv-Info, Refer-Events-At, Refer-Sub, Refer-To, Referred-By, Reject-Contact, Relayed-Charge, Replaces, Reply-To, Request-Disposition, Require, Resource-Priority, Resource-Share, Response-Key, Restoration-Info, Retry-After, Route, RSeq, Security-Client, Security-Server, Security-Verify, Server, Service-Route, Session-Expires, Session-ID, SIP-ETag, SIP-If-Match, Subject, Subscription-State, Supported Suppress-If-Match, Target-Dialog, Timestamp, To, Trigger-Consent, Unsupported, User-Agent, User-to-User, Via Warning, and WWW-Authenticate.

Data Collector and Miner 225 also comprises timer components that track multiple timers associated with various components in the IMS network, including the following IMS nodes: SBC, Emergency Call Session Control Function (ECSCF), Breakout Gateway Control Function/Media Gateway Control Function (BGCF/MGCF), and PSAPs. The disclosed system uses the timer components to help to detect when to take an action in response to a forked call. In addition, Data Collector and Miner 225 will initialize the Trts timer upon receiving an initial INVITE for a new call. RTMADS 200 maintains a separate Trts for each forked call (or SIP INVITE) that it receives. RTMADS 200 starts the timer from zero and tracks the duration of each INVITE to trigger decision module 245 if and when necessary.

Telephony Parametric Analyzer 235 detects call anomalies and attacks based on specific analysis criteria 240 and alerts decision module 245 to take action. Telephony Parametric Analyzer 235 performs temporal and parametric analysis on data from real time stateful table 230 to identify patterns that repeat over time and parameter values. Telephony Parametric Analyzer 235 also monitors the multiple timers maintained by the disclosed system and facilitates the taking of actions based on timer criteria. For example, in an embodiment, the disclosed system may take action when Trts<T (configured timer values on all IMS nodes to wait for INVITE response). In this example, the disclosed system ensures that any action taken by RTMADS 200 must be taken before the timer expiration of any other nodes in the IMS network. Otherwise, expiration of the timer could trigger one or more of the nodes into action.

Decision Module 245 is a collection of standardized and compliant decision functions that are executed based on the decision criteria 250 and the specifics of the attack involved, as explained in more detail herein. The decision matrix is adapted to send one or more alarms 255, initiate calls 260, or terminate calls 265, as also described in more detail herein. In addition, Decision Module 245 may request additional information from call probe 275 in circumstances where more specific call data is needed in order to make a decision regarding an incoming call.

Figure 3:
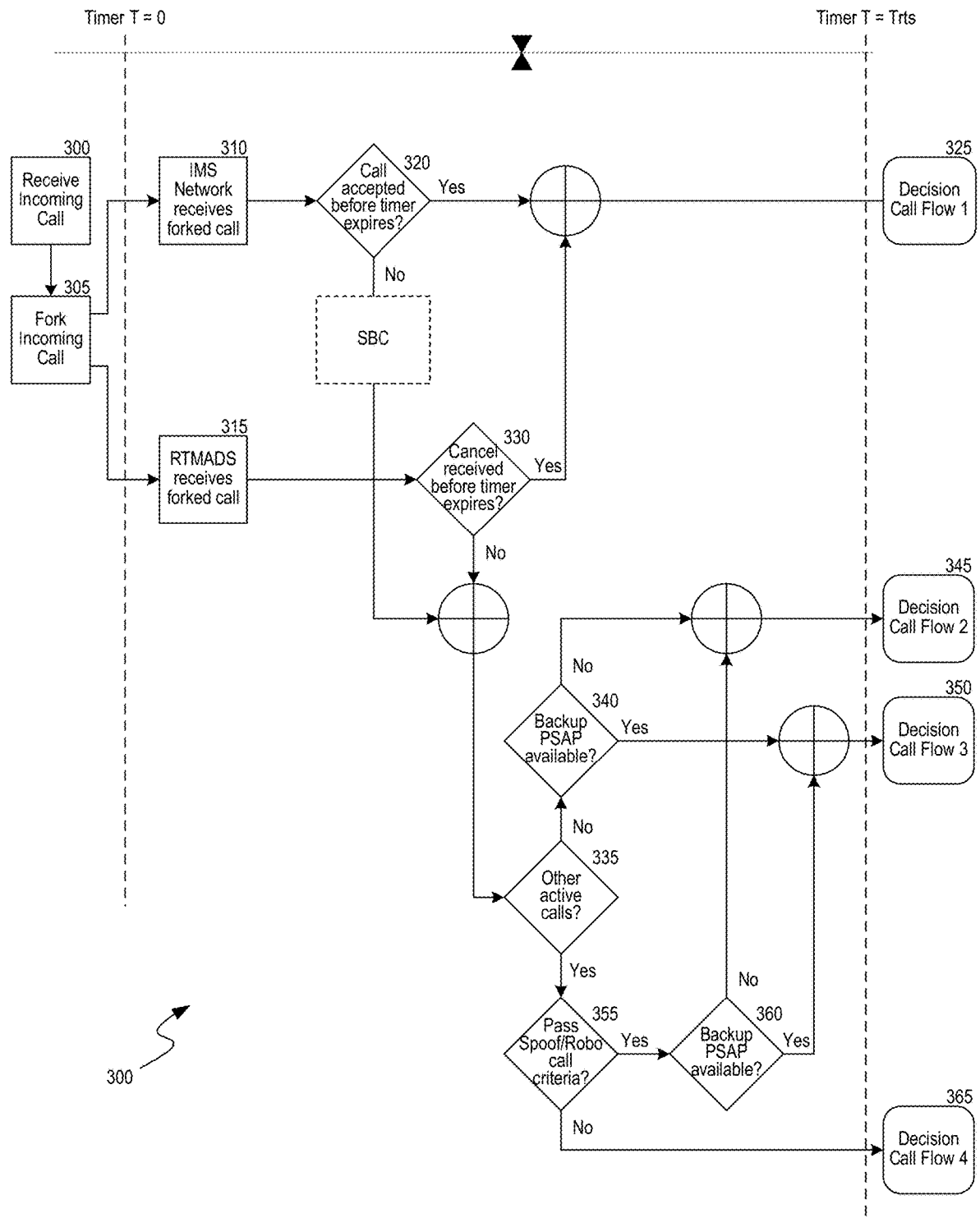
FIG. 3 represents a flow chart 300 for making a call handling decision in a Real-time Telephony (or Call) Monitor, Analyzer and Decision SIP Server (RTMADS) in accordance with embodiments herein.

FIG. 3 represents a flow chart 300 for making a call handling decision in a RTMADS in accordance with embodiments herein. In the embodiment of FIG. 3, RTMADS processing of a call results in one of four possible decisions. In Decision Call Flow 1, RTMADS allows an incoming call to be setup using dedicated PSAPs (i.e., using the existing IMS network). In Decision Call Flow 2, RTMADS alerts an OAM team to make a decision regarding the incoming call. In Decision Call Flow 3, RTMADS allows an incoming call to be setup using a backup PSAP. In Decision Call Flow 4, RTMADS accepts and terminates the incoming call. The decision path for reaching each of these decision call flows is discussed in more detail below.

Decision Call Flow 1

In the embodiment of FIG. 3, Decision Call Flow 1 (step 325) is reached in instances including when relatively little or no congestion exists on the IMS network, when an emergency call is successfully accepted by the IMS network, and when the emergency call can be setup using dedicated PSAPs. RTMADS Decision Process Flow 300 illustrates embodiments in which Decision Call Flow 1 may be reached. In particular, the disclosed system receives an emergency call (step 300) and passes the received emergency call to an SBC (step 305). Upon receiving the emergency call, the SBC forks the received call (e.g., by forking an SIP INVITE request associated with the emergency call) to both the IMS network (step 310) and the RTMADS (step 315). Upon forking the emergency call to the IMS network and the RTMADS, the system starts a timer that is associated with an expiration time Trts that is used to gauge the level on congestion on the IMS network. At step 320, if the IMS network accepts the emergency call before the timer expires (i.e., before the time elapsed reaches Trts), then the system determines that Decision Call Flow 1 has been reached. Decision Call Flow 1 also may be reached if the RTMADS receives a CANCEL from the SBC before the timer expires (step 330). In instances where Decision Call Flow 1 is reached, the emergency call is processed in a typically normal fashion such that the emergency call setup is performed using dedicated PSAPs (i.e., using the existing IMS network). Additional details regarding Decision Call Flow 1 are provided below in reference to the call flow diagram of FIG. 4.

Decision Call Flow 2

In the embodiment of FIG. 3, Decision Call Flow 2 (step 345) is reached in instances when there is relatively moderate to severe congestion in the IMS network and no backup PSAPs are available. RTMADS Decision Process Flow 300 illustrates embodiments in which Decision Call Flow 2 may be reached. At step 330, if the RTMADS does not receive a CANCEL from the SBC before the timer expires, then the system determines whether any other emergency telephone calls are currently active (step 335). If the system determines that no other emergency calls are active, the system then determines whether one or more backup PSAPs are available (step 340). If the system determines that no backup PSAPs are available, then Decision Call Flow 2 is reached. Decision Call Flow 2 also may be reached when the system determines that one or more other emergency calls are active (step 335), that the emergency call passes spoof/robocall filter criteria (step 355), and that no backup PSAPs are available (step 360). When Decision Call Flow 2 is reached, the disclosed system is adapted to provide an alert (for example, an alert to an OAM team) to determine what action is appropriate (e.g., processing the emergency call using a backup PSAP or terminating the emergency call). Additional details regarding Decision Call Flow 2 are provided below in reference to the call flow diagram of FIG. 5.

Decision Call Flow 3

In the embodiment of FIG. 3, Decision Call Flow 3 (step 350) is reached in instances when there is relatively moderate to severe congestion in the IMS network and one or more backup PSAPs are available. RTMADS Decision Process Flow 300 illustrates embodiments in which Decision Call Flow 3 may be reached. At step 330, if RTMADS does not receive a CANCEL from the SBC before the timer expires, then the system determines whether any other emergency telephone calls are currently active (step 335). If the system determines that there are no other emergency calls active, the system then determines whether one or more backup PSAPs are available (step 340). If the system determines that one or more backup PSAPs are available, then Decision Call Flow 3 is reached. Decision Call Flow 3 may also be reached when the system determines that one or more other emergency calls are active (step 335), that the emergency call passes spoof/robocall filter criteria (step 355), and that one or more backup PSAPs are available (step 360). When Decision Call Flow 3 is reached, the disclosed system is adapted to perform call setup for the emergency call using backup PSAPs. Additional details regarding Decision Call Flow 3 are provided below in reference to the call flow diagram of FIG. 6.

Decision Call Flow 4

In the embodiment of FIG. 3, Decision Call Flow 4 (step 365) is reached in instances when there is relatively moderate to severe congestion in the IMS network and the system determines that the emergency call is part of an attack on the emergency call system (e.g., a malicious attack or denial of service attack). RTMADS Decision Process Flow 300 illustrates embodiments in which Decision Call Flow 4 may be reached. At step 330, if RTMADS does not receive a CANCEL from the SBC before the timer expires, then the system determines whether any other emergency telephone calls are currently active (step 335). If the system determines that one or more other emergency calls are active, the system then determines whether the emergency call passes spoof/robocall filter criteria that is maintained by the RTMADS (step 355). If the system determines that the emergency call does not pass spoof/robocall filter criteria, then Decision Call Flow 4 is reached. When Decision Call Flow 4 is reached, the disclosed system is adapted to accept and then terminate the emergency call. Additional details regarding Decision Call Flow 4 are provided below in reference to the call flow diagram of FIG. 7.

Figure 4:
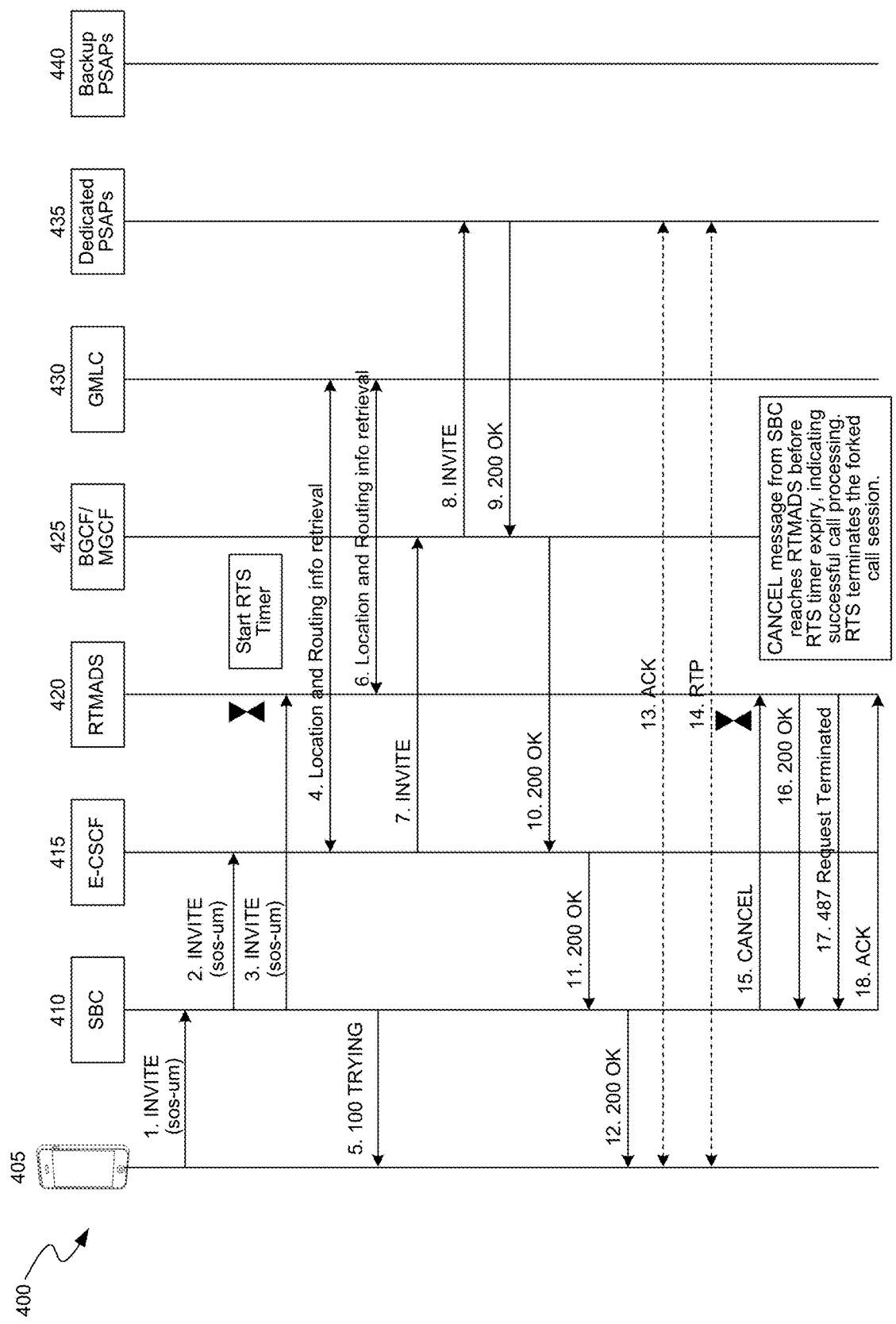
FIG. 4 is a sample call flow diagram for arriving at a first decision call flow (Decision Call Flow 1) in accordance embodiments herein.

FIG. 4 is a sample call flow diagram for arriving at Decision Call Flow 1 in accordance embodiments herein. At step 1, Mobile Device 405 transmits INVITE (sos-um) towards SBC 410. At step 2, SBC 410 transmits INVITE (sos-um) towards E-CSCF 415. At step 3, SBC 410 transmits INVITE (sos-um) towards RTMADS 420, and the system starts timer RTS. At step 4, location and routing information retrieval occurs between E-CSCF 415 and Gateway Mobile Location Center (GMLC) 430. At step 5, SBC 410 transmits 100 TRYING message towards Mobile Device 405. At step 6, location and routing information retrieval occurs between RTMADS 420 and GMLC 430. At step 7, E-CSCF 415 transmits INVITE towards BGCF/MGCF 425. At step 8, BGCF/MGCF 425 transmits INVITE towards one or more Dedicated PSAPs 435. At step 9, one or more dedicated PSAPs 435 transmits 200 OK towards BGCF/MGCF 425. At step 10, BGCF/MGCF 425 transmits 200 OK towards E-CSCF 415. At step 11, E-CSCF 415 transmits 200 OK towards SBC 410. At step 12, SBC 410 transmits 200 OK towards Mobile Device 405. At step 13, an acknowledge (ACK) message is transmitted between Mobile Device 405 and one or more dedicated PSAPs 435. At step 14, a Real-time Transport Protocol (RTP) message is transmitted between Mobile Device 405 and one or more dedicated PSAPs 435. At step 15, SBC 410 transmits CANCEL message towards RTMADS 420. In the depicted embodiment, the CANCEL message reaches RTMADS before the RTS timer expires, thereby indicating successful emergency call processing. As a result, the RTMADS terminates the forked call session. At step 16, RTMADS 420 transmits 200 OK towards SBC 410. At step 17, RTMADS transmits 487 Request Terminated message towards SBC 410. At step 18, SBC 410 transmits ACK message towards RTMADS 420.

Figure 5:
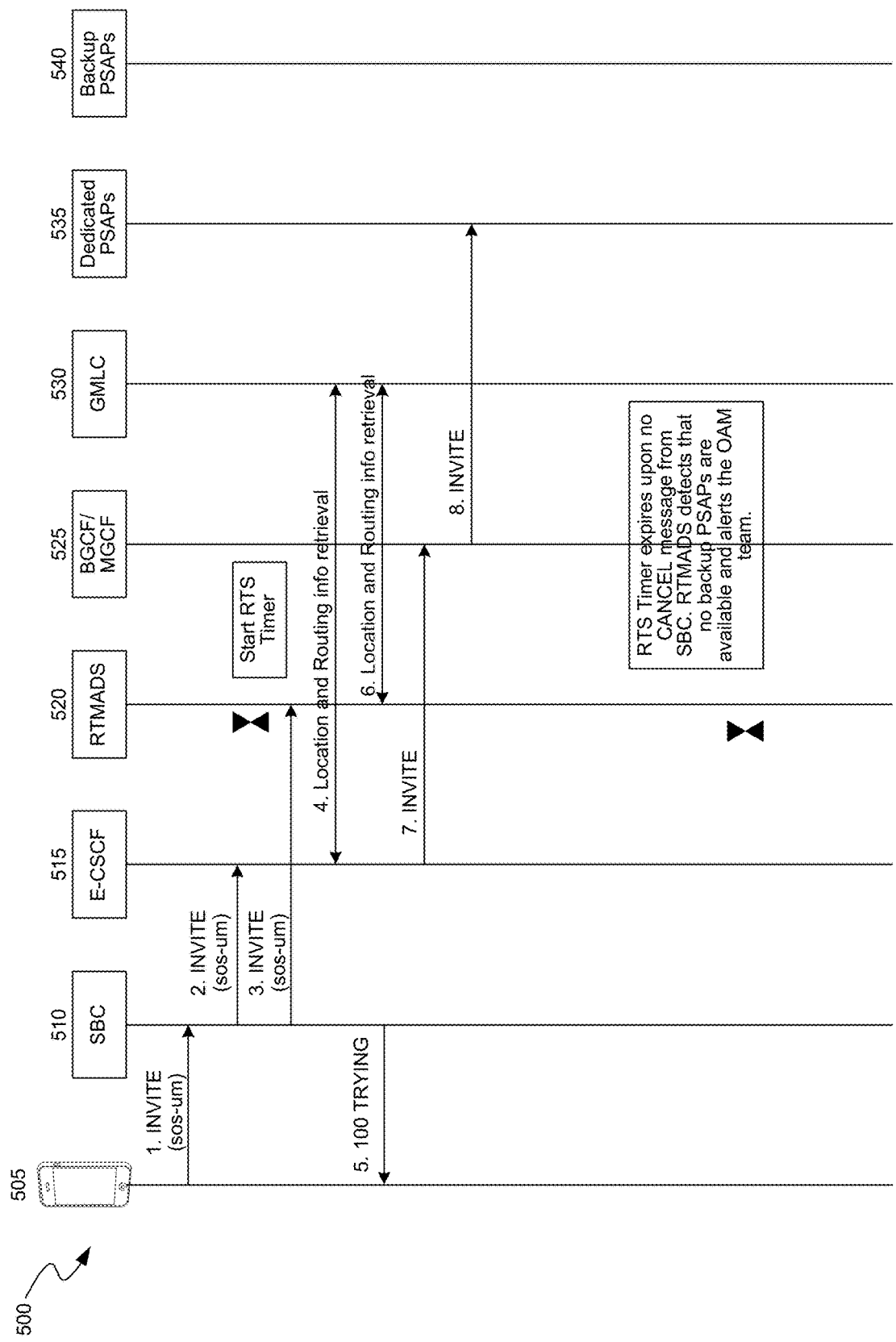
FIG. 5 is a sample call flow diagram for arriving at a second decision call flow (Decision Call Flow 2) in accordance embodiments herein.

FIG. 5 is a sample call flow diagram for arriving at Decision Call Flow 2 in accordance embodiments herein. At step 1, Mobile Device 505 transmits INVITE (sos-um) towards SBC 510. At step 2, SBC 510 transmits INVITE (sos-um) towards E-CSCF 515. At step 3, SBC 510 transmits INVITE (sos-um) towards RTMADS 520, and the system starts the RTS timer. At step 4, location and routing information retrieval occurs between E-CSCF 515 and GMLC 530. At step 5, SBC 510 transmits 100 TRYING message towards Mobile Device 505. At step 6, location and routing information retrieval occurs between RTMADS 520 and GMLC 530. At step 7, E-CSCF 515 transmits INVITE towards BGCF/MGCF 525. At step 8, BGCF/MGCF 525 transmits INVITE towards one or more Dedicated PSAPs 535. In the depicted embodiment, the RTS timer expires upon no CANCEL message being received from the SBC. RTMADS 520 detects that no backup PSAPs are available, and alerts the OAM team.

Figure 6:
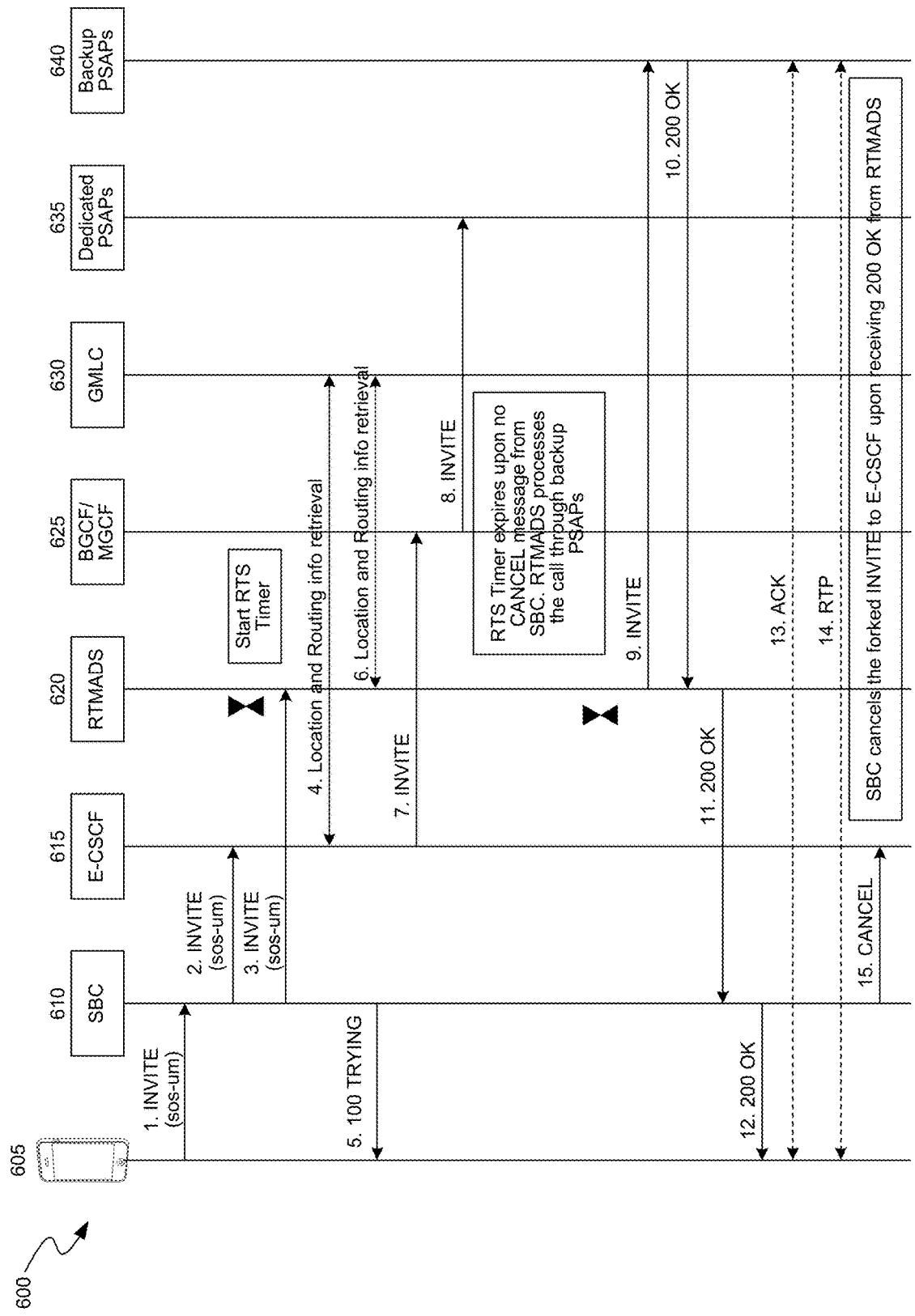
FIG. 6 is a sample call flow diagram for arriving at a third decision call flow (Decision Call Flow 3) in accordance embodiments herein.

FIG. 6 is a sample call flow diagram for arriving at Decision Call Flow 3 in accordance embodiments herein. At step 1, Mobile Device 605 transmits an INVITE (sos-um) message towards SBC 610. At step 2, SBC 610 transmits an INVITE (sos-um) message towards E-CSCF 615. At step 3, SBC 610 transmits an INVITE (sos-um) message towards RTMADS 620, and the system starts the RTS timer. At step 4, location and routing information and retrieval data is transmitted between E-CSCF 615 and GMLC 630. At step 5, SBC 610 transmits a 100 TRYING message towards Mobile Device 605. At step 6, location and routing information and retrieval data is transmitted between RTMADS 620 and GMLC 630. At step 7, E-CSCF 615 transmits an INVITE message towards BGCF/MGCF 625. At step 8, BGCF/MGCF 625 transmits an INVITE message towards one or more dedicated PSAPs 635. In the embodiment of FIG. 6, the RTS timer expires upon not receiving a CANCEL message from the SBC. As a result, RTMADS 620 completes the emergency call through one or more backup PSAPs 640. At step 9, RTMADS 620 transmits an INVITE message towards one or more backup PSAPs 640. At step 10, one or more backup PSAPs 640 transmits a 200 OK message towards RTMADS 620. At step 11, RTMADS 620 transmits a 200 OK message towards SBC 610. At step 12, SBC 610 transmits a 200 OK message towards Mobile Device 605. At step 13, an ACK message is transmitted between Mobile Device 605 and one or more backup PSAPs 640. At step 14, an RTP message is transmitted between Mobile Device 605 and one or more backup PSAPs 640. At step 15, SBC 610 transmits a CANCEL message towards E-CSCF 615 in order to cancel the forked INVITE to the E-CSCF upon receiving a 200 OK message from RTMADS 620.

Figure 7:
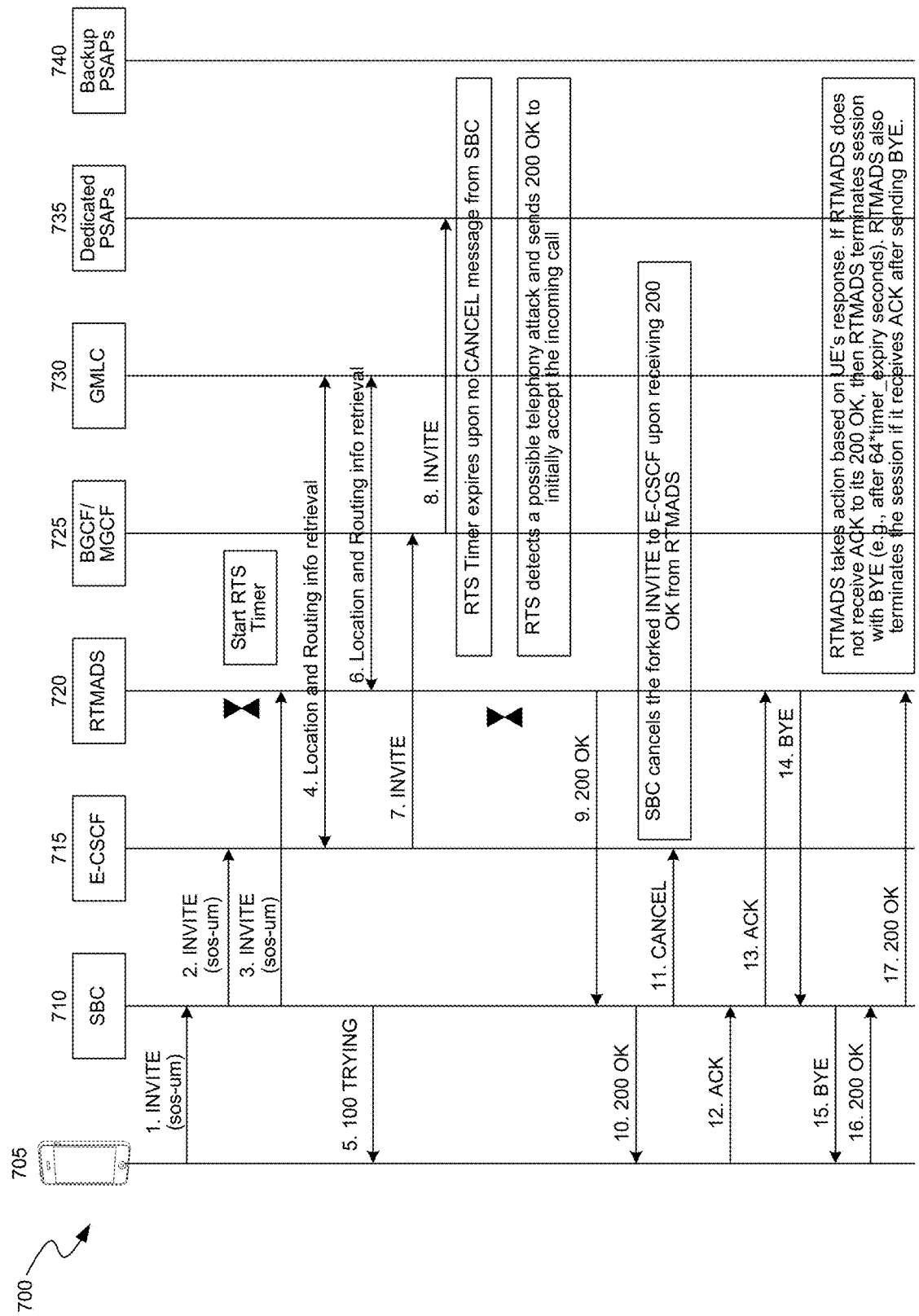
FIG. 7 is a sample call flow diagram for arriving at a fourth decision call flow (Decision Call Flow 4) in accordance embodiments herein.

FIG. 7 is a sample call flow diagram for arriving at Decision Call Flow 4 in accordance embodiments herein. At step 1, Mobile Device 705 transmits an INVITE (sos-urn) message towards SBC 710. At step 2, SBC 710 transmits an INVITE (sos-urn) message towards E-CSCF 715. At step 3, SBC 710 transmits an INVITE (sos-urn) message towards RTMADS 720, and the system starts the RTS timer. At step 4, location and routing information and retrieval data is transmitted between E-CSCF 715 and GMLC 630. At step 5, SBC 710 transmits a 100 TRYING message towards Mobile Device 705. At step 6, location and routing information and retrieval data is transmitted between RTMADS 720 and GMLC 730. At step 7, E-CSCF 715 transmits an INVITE message towards BGCF/MGCF 725. At step 8, BGCF/MGCF 725 transmits an INVITE message towards one or more dedicated PSAPs 735. In the embodiment of FIG. 7, the RTS timer expires upon not receiving a CANCEL message from the SBC, and the system detects that an attack is in progress.

At step 9, RTMADS 720 initially accepts the emergency call by transmitting a 200 OK message towards SBC 710, which then transmits the 200 OK message towards Mobile Device 705 (step 10). At step 11, SBC 710 transmits a CANCEL message towards E-CSCF 715 to cancel the forked INVITE to the E-CSCF upon receiving the 200 OK message from RTMADS 720. In some embodiments, Mobile Device 705 transmits an ACK message towards SBC 701 (step 12), which in turn transmits the ACK message towards RTMADS 720 (step 13). In other embodiments, RTMADS may not receive an ACK message from Mobile Device 705 via SBC 710. In such embodiments, RTMADS 720 will terminate the session by sending a BYE message to SBC 710 (step 14) after a predetermined period of time (e.g., 64*timer expiry seconds). RTMADS 720 will also terminate the session if it receives an ACK message in response to a BYE message. At step 15, SBC 710 transmits the BYE message to Mobile Device 705. Mobile Device 705 transmits a 200 OK towards SBC 710 (step 16), which then transmits the 200 OK message towards RTMADS 720 (step 17).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. When statements or subject matter in an incorporated by reference conflict with statements or subject matter of this application, then this application shall control.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, certain aspects of the disclosed system be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

We claim:

1. A Real-time Call Monitor, Analyzer and Decision SIP Server (RTMADS) to detect and mitigate an attack on emergency telephone services, the RTMADS comprising:
    a data collector and miner to receive an incoming call from a node in an Internet Protocol Multimedia Subsystem (IMS) network,
        wherein the data collector and miner populates contents of at least one data structure based on one or more parameters associated with the incoming call,
        wherein the data collector and miner comprises timer components that track at least one timer associated with one or more of the following components in the IMS network:
            Session Border Controller (SBC), or
            Emergency Call Session Control Function (ECSCF), or
            Breakout Gateway Control Function/Media Gateway Control Function (BGCF/MGCF), or
            Public Safety Answering Point (PSAP), or
            any combination thereof;
    a telephony parametric analyzer to detect call anomalies based at least on the populated contents of the at least one data structure
    a decision module to determine at least one action to be taken with respect to the incoming call,
        wherein when the telephony parametric analyzer detects at least one call anomaly with respect to the incoming call, the decision module determines the at least one action based at least on the populated contents of the at least one data structure.

2. The Real-time Call Monitor, Analyzer and Decision SIP Server of claim 1, wherein the incoming call is destined for a Public Safety Answering Point (PSAP).

3. The Real-time Call Monitor, Analyzer and Decision SIP Server of claim 1, wherein the data structure is a real-time stateful data structure.

4. The Real-time Call Monitor, Analyzer and Decision SIP Server of claim 1,
    wherein the data collector and miner maintains separate timer components for each received incoming call, and
    wherein the telephony parametric analyzer detects at least one call anomaly using a value of at least one of the timer components associated with the incoming call.

5. The Real-time Call Monitor, Analyzer and Decision SIP Server of claim 1, wherein the at least one timer gauges a level of congestion in the IMS network.

6. The Real-time Call Monitor, Analyzer and Decision SIP Server of claim 1, wherein the decision module determines the at least one action based on a type of the detected at least one call anomaly.

7. The Real-time Call Monitor, Analyzer and Decision SIP Server of claim 1, wherein the telephony parametric analyzer detects the call anomalies by performing temporal analysis, parametric analysis, or both on the populated contents of the at least one data structure to identify repeating patterns.

8. The Real-time Call Monitor, Analyzer and Decision SIP Server of claim 1, wherein the determined at least one action is:
    performing call setup using a dedicated PSAP, or
    providing an alert to an operator, or
    performing call setup using a backup PSAP, or
    terminating the incoming call, or
    transmitting an alarm, or
    requesting information not previously received regarding the incoming call, or
    any combination thereof.

9. The Real-time Call Monitor, Analyzer and Decision SIP Server of claim 1, wherein the determined at least one action is performing call setup using a dedicated PSAP, and wherein the RTMADS determines to perform the call setup using the dedicated PSAP when:
    a level of congestion in the IMS network is in a range that indicates low to no congestion, or
    the incoming call is successfully accepted by the IMS network, or
    the incoming call can be setup using the dedicated PSAP, or
    the RTMADS receives a cancel message from the node in the IMS network before a timer expires.

10. The Real-time Call Monitor, Analyzer and Decision SIP Server of claim 1, wherein the determined at least one action is providing an alert, and wherein the RTMADS determines to provide the alert when:
    a level of congestion in the IMS network is in a range that indicates moderate to severe congestion and no backup PSAPs are available, or
    the RTMADS does not receive a cancel message from the node in the IMS network before a timer expires, no other incoming calls are active, and no backup PSAPs are available, or
    the RTMADS does not receive a cancel message from the node in the IMS network before a timer expires, at least one other incoming call is active, the at least one other incoming call passes spoof criteria, and no backup PSAPs are available.

11. The Real-time Call Monitor, Analyzer and Decision SIP Server of claim 1, wherein the determined at least one action is performing call setup using a backup PSAP, and wherein the RTMADS determines to perform the call setup using the backup PSAP when:
    a level of congestion in the IMS network is in a range that indicates moderate to severe congestion and at least one backup PSAP is available, or
    the RTMADS does not receive a cancel message from the node in the IMS network before a timer expires, no other incoming calls are active, and at least one backup PSAP is available, or
    the RTMADS does not receive a cancel message from the node in the IMS network before a timer expires, at least one other incoming call is active, the at least one other incoming call passes spoof criteria, and at least one backup PSAP is available.

12. The Real-time Call Monitor, Analyzer and Decision SIP Server of claim 1, wherein the determined at least one action is accepting and terminating the incoming call, and wherein the RTMADS determines to accept and terminate the incoming call when:
- a level of congestion in the IMS network is in a range that indicates moderate to severe congestion and the RTMADS determines that the incoming call is part of an attack, or
- the RTMADS does not receive a cancel message from the node in the IMS network before a timer expires, at least one other incoming call is active, and the at least one other incoming call does not pass spoof criteria.

13. A method to detect and mitigate an attack on emergency telephone services, the method comprising:
- receiving a forked incoming call from an ingress node in an Internet Protocol Multimedia Subsystem (IMS) network;
- populating contents of at least one data structure based on one or more parameters associated with the incoming call;
- detecting call anomalies based at least on the populated contents of the at least one data structure;
- when at least one call anomaly is detected with respect to the incoming call, determining at least one action to be taken with respect to the incoming call,
  - wherein the at least one action is determined based at least on the populated contents of the at least one data structure; and
- tracking values of at least one timer associated with one or more components in the IMS network,
  - wherein a Real-time Call Monitor, Analyzer and Decision SIP Server maintains separate timers for each received incoming call, and
  - wherein the at least one call anomaly is detected using a value of the at least one timer.

14. The method of claim 13, wherein the call anomalies are detected by performing temporal analysis, parametric analysis, or both on the populated contents of the at least one data structure to identify repeating patterns.

15. The method of claim 13, wherein the determined at least one action is:
- performing call setup using a dedicated PSAP, or
- providing an alert to an operator, or
- performing call setup using a backup PSAP, or
- terminating the incoming call, or
- transmitting an alarm, or
- requesting information not previously received regarding the incoming call, or any combination thereof.

16. A computer-readable medium storing instructions that, when executed by a processor, perform a method to detect and mitigate an attack on emergency communication services, the method comprising:
- receiving an incoming call from a node in an Internet Protocol Multimedia Subsystem (IMS) network;
- populating contents of at least one data structure based on one or more parameters associated with the incoming call;
- detecting call anomalies based at least on the populated contents of the at least one data structure;
- when at least one call anomaly is detected with respect to the incoming call, determining at least one action to be taken with respect to the incoming call,
  - wherein the at least one action is determined based at least on the populated contents of the at least one data structure; and
- tracking values of at least one timer associated with one or more components in the IMS network,
  - wherein the at least one timer gauges a level of congestion in the IMS network.

17. The computer-readable medium of claim 16, wherein the call anomalies are detected by performing temporal analysis, parametric analysis, or both on the populated contents of the at least one data structure to identify repeating patterns.

18. The computer-readable medium of claim 16, wherein the determined at least one action is:
- performing call setup using a dedicated PSAP, or
- providing an alert to an operator, or
- performing call setup using a backup PSAP, or
- terminating the incoming call, or
- transmitting an alarm, or
- requesting information not previously received regarding the incoming call.

19. The method of claim 13,
wherein the determined at least one action is performing call setup using a dedicated PSAP, and wherein the Real-time Call Monitor, Analyzer and Decision SIP Server determines to perform the call setup using the dedicated PSAP when:
- a level of congestion in the IMS network is in a range that indicates low to no congestion, or
- the incoming call is successfully accepted by the IMS network, or
- the incoming call can be setup using the dedicated PSAP, or
- the Real-time Call Monitor, Analyzer and Decision SIP Server receives a cancel message from the node in the IMS network before a timer expires;

wherein the determined at least one action is providing an alert, and wherein the Real-time Call Monitor, Analyzer and Decision SIP Server determines to provide the alert when:
- a level of congestion in the IMS network is in a range that indicates moderate to severe congestion and no backup PSAPs are available, or
- the Real-time Call Monitor, Analyzer and Decision SIP Server does not receive a cancel message from the node in the IMS network before a timer expires, no other incoming calls are active, and no backup PSAPs are available, or
- the Real-time Call Monitor, Analyzer and Decision SIP Server does not receive a cancel message from the node in the IMS network before a timer expires, at least one other incoming call is active, the at least one other incoming call passes spoof criteria, and no backup PSAPs are available;

wherein the determined at least one action is performing call setup using a backup PSAP, and wherein the Real-time Call Monitor, Analyzer and Decision SIP Server determines to perform the call setup using the backup PSAP when:
- a level of congestion in the IMS network is in a range that indicates moderate to severe congestion and at least one backup PSAP is available, or
- the Real-time Call Monitor, Analyzer and Decision SIP Server does not receive a cancel message from the node in the IMS network before a timer expires, no other incoming calls are active, and at least one backup PSAP is available, or the Real-time Call Monitor, Analyzer and Decision SIP Server does not receive a cancel message from the node in the IMS network before a timer expires, at least one other incoming call is active, the at least one other incoming call passes spoof criteria, and at least one backup PSAP is available; and wherein the determined at least one action is accepting and terminating the incoming call, and wherein the Real-time Call Monitor, Analyzer and Decision SIP Server determines to accept and terminate the incoming call when:
- a level of congestion in the IMS network is in a range that indicates moderate to severe congestion and the Real-time Call Monitor, Analyzer and Decision SIP Server determines that the incoming call is part of an attack, or
- the Real-time Call Monitor, Analyzer and Decision SIP Server does not receive a cancel message from the node in the IMS network before a timer expires, at least one other incoming call is active, and the at least one other incoming call does not pass spoof criteria.

20. The computer-readable medium of claim 16, wherein the determined at least one action is performing call setup using a dedicated PSAP, and wherein a Real-time Call Monitor, Analyzer and Decision SIP Server determines to perform the call setup using the dedicated PSAP when:
- a level of congestion in the IMS network is in a range that indicates low to no congestion, or
- the incoming call is successfully accepted by the IMS network, or
- the incoming call can be setup using the dedicated PSAP, or
- the Real-time Call Monitor, Analyzer and Decision SIP Server receives a cancel message from the node in the IMS network before a timer expires;

wherein the determined at least one action is providing an alert, and wherein the Real-time Call Monitor, Analyzer and Decision SIP Server determines to provide the alert when:
- a level of congestion in the IMS network is in a range that indicates moderate to severe congestion and no backup PSAPs are available, or
- the Real-time Call Monitor, Analyzer and Decision SIP Server does not receive a cancel message from the node in the IMS network before a timer expires, no other incoming calls are active, and no backup PSAPs are available, or
- the Real-time Call Monitor, Analyzer and Decision SIP Server does not receive a cancel message from the node in the IMS network before a timer expires, at least one other incoming call is active, the at least one other incoming call passes spoof criteria, and no backup PSAPs are available;

wherein the determined at least one action is performing call setup using a backup PSAP, and wherein the Real-time Call Monitor, Analyzer and Decision SIP Server determines to perform the call setup using the backup PSAP when:
- a level of congestion in the IMS network is in a range that indicates moderate to severe congestion and at least one backup PSAP is available, or
- the Real-time Call Monitor, Analyzer and Decision SIP Server does not receive a cancel message from the node in the IMS network before a timer expires, no other incoming calls are active, and at least one backup PSAP is available, or
- the Real-time Call Monitor, Analyzer and Decision SIP Server does not receive a cancel message from the node in the IMS network before a timer expires, at least one other incoming call is active, the at least one other incoming call passes spoof criteria, and at least one backup PSAP is available; and wherein the determined at least one action is accepting and terminating the incoming call, and wherein the Real-time Call Monitor, Analyzer and Decision SIP Server determines to accept and terminate the incoming call when:
- a level of congestion in the IMS network is in a range that indicates moderate to severe congestion and the Real-time Call Monitor, Analyzer and Decision SIP Server determines that the incoming call is part of an attack, or
- the Real-time Call Monitor, Analyzer and Decision SIP Server does not receive a cancel message from the node in the IMS network before a timer expires, at least one other incoming call is active, and the at least one other incoming call does not pass spoof criteria.

* * * * *